United States Patent Office 2,936,854
Patented May 17, 1960

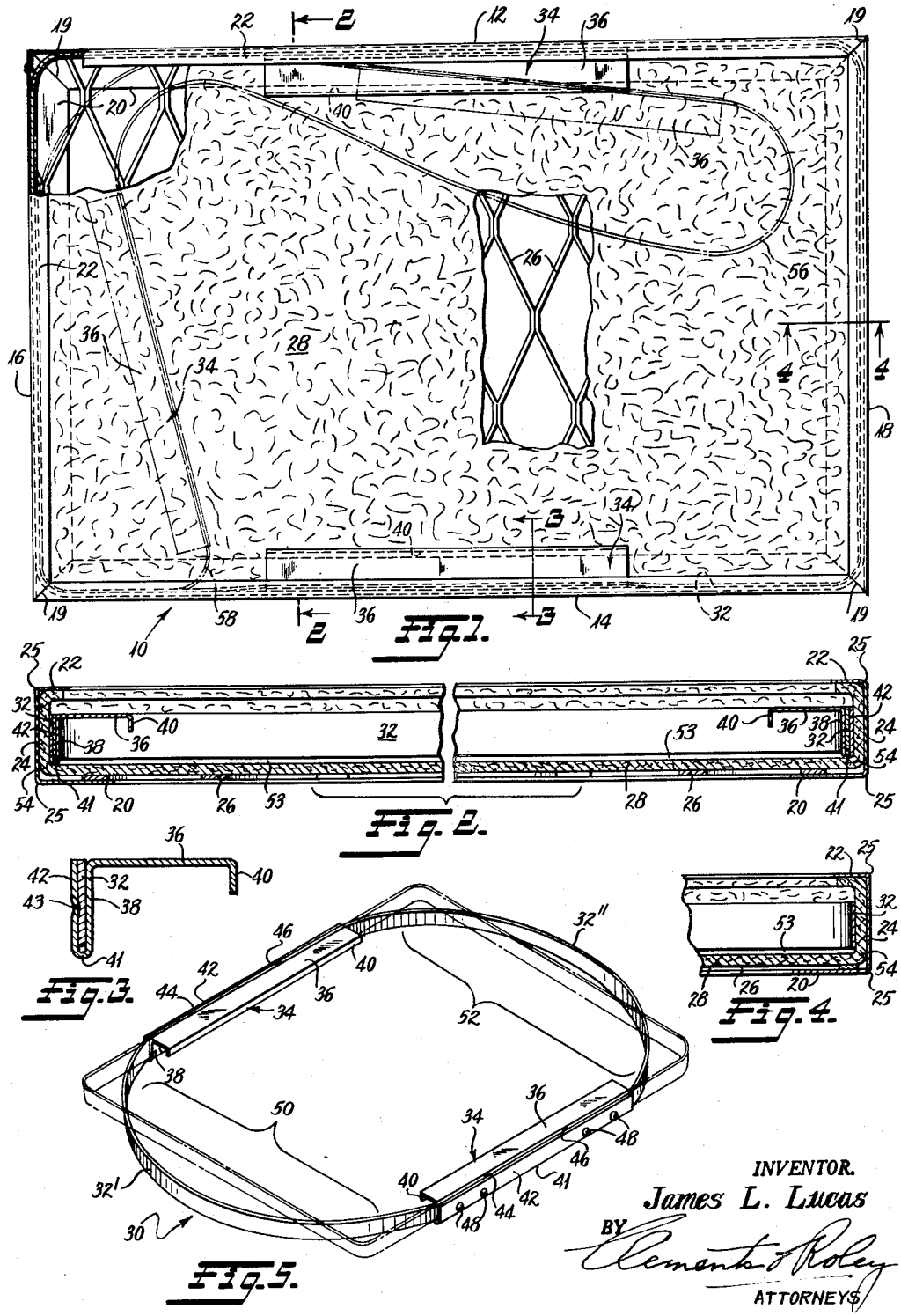

2,936,854
FILTER

James L. Lucas, Charlotte, N.C., assignor to George K. Le Brun and Aubrey H. Terrell, both of Bethesda, Md.

Application October 31, 1956, Serial No. 619,587

2 Claims. (Cl. 183—51)

This invention relates to a filter and more particularly to a removable filter having a readily replaceable filter medium.

Filters presently used in air conditioners, heating systems and the like comprise a frame or support formed as a shallow box and usually rectangular and having at least one filter medium supporting face which is of open mesh or foraminous construction. When such filters become clogged, they are discarded. Discarding the prior art filters entails considerable economic waste, as the frame and the supporting surface for the filter medium are not usually damaged or otherwise rendered useless by clogging of the filter medium.

It is an object of this invention to provide a filter having a disposable and replaceable filter medium.

It is another object of this invention to provide a filter having a durable frame and filter medium supporting means.

It is an additional object of this invention to provide a filter having a rigid frame and a readily exchangeable filter medium.

It is a further object of this invention to provide a filter having a rigid frame and also having manually releasable means for retaining a filter medium in fixed position in the frame.

Another object of this invention is to provide a filter having a rectangular frame, channel shaped in cross section, and having resilient means releasably holding a filter medium in the frame.

A further object of this invention is to provide an endless band type resilient means for retaining a filter medium in its frame.

An additional object of this invention is to provide an endless band type filter retaining means having combined strengthening and finger engaging means incorporated therewith.

Yet another object of this invention is to provide a filter retaining means comprising an endless band of spring material having means for finger engagement therewith.

Another object of this invention is to provide a filter medium retaining means comprising an endless band a major portion of which is spaced above the plane of the filter when in operative position.

A further object of this invention is to provide an endless band filter medium retaining means which will not appreciably abrade the filter medium when being placed in operative position.

The above and other objects will become apparent in the following specification taken with the accompanying drawings forming a part thereof.

In the drawings wherein like characters of reference refer to like parts in the several figures:

Fig. 1 is a plan view of the filter showing the retaining means in operative position in dotted lines and showing in dot-dash lines the manner of inserting and removing said means;

Fig. 2 is an enlarged sectional view taken substantially on the line 2—2 of Fig. 1, looking in the direction of the arrows;

Fig. 3 is a still further enlarged fragmentary sectional view taken on the line 3—3 of Fig. 1, with the channel shaped side member and filter medium omitted;

Fig. 4 is a fragmentary sectional view taken on the lines 4—4 of Fig. 1, looking in the direction of the arrows, and Fig. 5 is a perspective view showing a slightly modified form of the means for retaining the filter medium in an operative position, showing the relaxed position thereof in full lines and the position assumed in use in dotted lines.

Referring now to Fig. 1 of the drawings, wherein there is shown a filter unit 10 comprising channel shaped side members 12, 14 and channel shaped end members 16, 18. The side members 12, 14 and the end members 16, 18 are joined at their ends 19 in any suitable manner, as by spot welding, soldering or they may be integral, to form a shallow rectangular box frame. Each of the side and end members is substantially U-shaped in cross section and defines a channel having a relatively wide bottom web 20 disposed in a plane and illustrated as being substantially horizontal, a relatively narrow overhanging top web 22 disposed in a plane substantially parallel to the plane of the web 20, and an intermediate side member 24 disposed in a plane substantially normal to the plane of the webs 20 and 22. The intermediate side member 24 is secured along its longitudinal edges, as at 25, to the outer peripheral edges of the members 20, 22. On the bottom webs 20, there is secured an open mesh or foraminous sheet 26 for supporting a filter medium 28 to be hereinafter described.

The channel frame members 12, 14, 16 and 18 are each formed of suitable sheet metal but they may be formed as channels by extrusion of either metal or plastic, and may be joined as above described or in any suitable well known manner. The filter medium supporting sheet 26 may be formed by a plastic molding process, or it may be formed from sheet metal by the "expanded metal" process.

A sheet material filter medium 28 is cut to a size to fit the configuration of the filter unit 10, and rests on the support 26 and engages the channel side members 24. While any sheet filter material may be used, I prefer to use a cellulosic batting or lap type material known commercially as "AlleRtex." This is a very porous web of loosely agglomerated cellulosic fibres such as a card lap of such fibres taken from a carding machine.

A spring retaining means 30 in the form of an endless band 32 of spring material, made of suitable metal or plastic is employed to retain the filter medium in operative position in the filter unit 10.

At diametrically opposed sides on the band 32, there are secured handle-forming channel members 34, each having a relatively wide intermediate top web 36, a depending outer side 38 and a depending finger gripping inner lip 40. The respective outer side 38 and the inner lip 40 are disposed in planes substantially parallel to the respective members 24. The side 38 is turned back upon itself to provide a longitudinal edge moving a smooth round surface 41 which directly engages the filter medium 26 at the maximum outer extremity thereof to provide a maximum filter area. The turned back portion 42 is parallel to and spaced from the outer side 38 a distance substantially equal to the thickness of the band 32 and the turned portion 42 defines with the outer sides 38 a clamping and stiffening element which is U-shaped in cross section and through which the band 32 passes, see Figures 1–3.

As heretofore described the band 32 is endless and is carried by each of the channel members 34 through the resilient properties of the turned portion 42 and the outer sides 38. If desirable, and as illustrated, indentations such as crimps or pinches 43, note Fig. 3, may be formed in each turned back portion 42 in order to more readily secure the band 32 between the portion 42 and sides 38. However, such crimps or pinches are not absolutely necessary and the band 32 may be easily removably retained in a desired position between the portions 42 and sides 38 without using such indentations. It is to be understood that the endless band 32 is continuously exerting an outward pressure which retains the filter medium 28 in its desired position.

As a modification of the retaining means 30 there is illustrated in Fig. 5 two relatively short resilient spring elements 32', 32" each having an end thereof permanently secured within the U-shaped clamping and stiffening elements defined by the turned portions 42 and the outer sides 38 of the respective channel members 34, by means of rivets 48 or other suitable securing means.

Similarly a single band of spring material may be used wherein only its two ends will be permanently held within the U-shaped portions of one channel mmeber 34 with the intermediate portion of the band secured as disclosed above to the other channel member 34. This modification is not detailed in the drawings, but is believed to be within the inventive concept as illustrated herein.

Attention is directed to Figure 5 wherein there is illustrated the disposition of the portion of the band 32', 32" which is intermediate the respective channel members 34, and it is to be noted that these portions of the band which are designated generally as loops 50, 52 are spaced, as illustrated at 53, from the curved angle portions 54 of the filter medium 28, so that the loops 50, 52 engage the portion of the filter medium which is in contact with the channel wall 24 to insure that the maximum pressure may be exerted against the filter medium to retain it in the desired position with the maximum area thereof available for filter purposes.

It is also to be understood that the members 36 may be formed of metal or plastic as described above in regard to the members 12, 14, 16, 18 and 26.

To assemble the filter, the sheet of filter medium 28 is placed loosely in the channel side members 14, 16 and end members 18, and 20, and the retaining means 30 is grasped by the channel members 34 and drawn into a long narrow oval by bringing one member 34 into proximity to an end loop, 50 or 52, as shown in Fig. 1, to create elongated end looped portions 56 and 58. The end loop 58 is then placed against the filter medium 28 and thrust into the channel end member 16 as shown in dot-dash lines in Fig. 1. The other member 34 is then placed in the channel side member 12 as shown in dot-dash lines in Fig. 1, and the first mentioned member 34 is then moved toward the channel side member 14. Upon release of said first member 34, the retaining means 30 enters the channel side members 12, 14 and the end member 18, with the elongated loop 56 changing shape into that as shown by the dash lines for the band 32 and the solid lines for the members 34 in Fig. 1. The resiliency of the band 32 causes it to press the marginal portions of the filter medium 28 against the sides 24, and to stretch the portion thereof over the support 26 into a substantially taut condition.

To remove the filter medium, for replacement, the procedure above outlined is reversed. The finger engaging lips 40 are grasped and the band 32 is brought to the position shown in dot-dash lines in Fig. 1, whence it is removed and the filter medium is removed to be replaced as detailed above. The band 32 engages snugly into the angle formed by the sides 24 and the webs 20 and retains the filter medium 28 securely against the bottom support 26.

It should be apparent that I have devised a filter, which can be sold to users of air conditioners and warm air heaters etc., and which is permanent. In order to renew the filtering ability of the filter, it is necessary only to remove an inexpensive sheet of filtering medium which can be done in a few seconds; and at much less cost than that of replacing conventional filters.

It is to be understood that modifications may be made in the above described invention within the skill of the operator and the scope of the appended claims.

I claim:

1. In a filter unit comprising a rectangular frame having channel-shaped sides and ends secured together to define a shallow box, having an open top and bottom, a foraminous filter supporting member secured to the bottom of the box, a sheet of filter medium covering the foraminous member and having marginal portions disposed in the channel-shaped sides, the improvement comprising a resilient endless retainer removably engaging the filter medium in the channel-shaped sides and conforming to the shape of the frame, and oppositely spaced relatively rigid elongated handle-forming members secured to said band for removably interlocking same within the channel-shaped sides of the filter frame.

2. A resilient means for retaining a filter medium in a desired position in a filter frame, said means comprising a pair of elongated spring elements, a pair of elongated handle-forming clamping and stiffening elements, each of said spring elements having one end thereof secured to one of said clamping and stiffening elements and the other end thereof secured to the other of said clamping and stiffening elements of said handle to form an endless retaining band and to be manipulated thereby, each of said handle-forming clamping and stiffening elements comprising an elongated inturned top flange having a depending finger gripping lip at one end thereof, a depending outer side member at the other edge of said intermediate member, and said side member being turned upon itself to form a U-shaped clamping and stiffening means for receiving the ends of said spring elements.

References Cited in the file of this patent

UNITED STATES PATENTS

| | | |
|---|---|---|
| 1,385,502 | Smith | July 26, 1921 |
| 1,674,764 | Dauphinee | June 26, 1928 |
| 1,691,967 | Gammeter | Nov. 20, 1928 |
| 1,854,677 | Umensetter | Apr. 19, 1932 |
| 2,108,283 | Drew et al. | Feb. 15, 1938 |
| 2,449,102 | Beager et al. | Sept. 14, 1948 |
| 2,637,410 | Martin | May 5, 1953 |